US012779379B2

(12) United States Patent
Archibald et al.

(10) Patent No.: US 12,779,379 B2
(45) Date of Patent: Nov. 3, 2026

(54) METHOD FOR LIQUID FILTER ASSEMBLY

(71) Applicant: Hoffman Enclosures Inc., Anoka, MN (US)

(72) Inventors: Matthew R. Archibald, Derry, NH (US); Stefan Djuranec, Birkenfeld (DE); Allen DeMars, Elk River, MN (US); Abhishek Gupta, Maple Grove, MN (US); Michael J. Koehler, Ramsey, MN (US)

(73) Assignee: Hoffman Enclosures Inc., Anoka, MN (US)

( * ) Notice: Subject to any disclaimer, the term of this patent is extended or adjusted under 35 U.S.C. 154(b) by 711 days.

(21) Appl. No.: 17/893,649

(22) Filed: Aug. 23, 2022

(65) Prior Publication Data

US 2023/0055792 A1 Feb. 23, 2023

Related U.S. Application Data

(60) Provisional application No. 63/236,115, filed on Aug. 23, 2021.

(51) Int. Cl.
*B01D 35/16* (2006.01)
*B01D 35/157* (2006.01)

(52) U.S. Cl.
CPC ......... *B01D 35/16* (2013.01); *B01D 35/1573* (2013.01)

(58) Field of Classification Search
CPC ................................ B01D 35/16; B01D 35/12
See application file for complete search history.

(56) References Cited

U.S. PATENT DOCUMENTS

| | | | | | |
|---|---|---|---|---|---|
| 3,815,746 | A * | 6/1974 | Ward | B01D 35/12 | 210/436 |
| 4,341,642 | A | 7/1982 | Koepke et al. | | |
| 4,372,129 | A | 2/1983 | Bennett et al. | | |
| 4,478,714 | A | 10/1984 | Blake et al. | | |
| 4,556,486 | A * | 12/1985 | Merket | B01D 35/12 | 210/411 |
| 5,053,141 | A | 10/1991 | Laiho | | |
| 5,073,260 | A * | 12/1991 | Wilkendorf | B01D 35/12 | 210/424 |
| 5,149,449 | A | 9/1992 | Strid et al. | | |
| 5,374,360 | A * | 12/1994 | Weis | B01D 33/463 | 210/791 |
| 5,896,922 | A | 4/1999 | Chrysler et al. | | |
| 5,934,364 | A | 8/1999 | Chrysler et al. | | |
| 5,954,127 | A | 9/1999 | Chrysler et al. | | |
| 5,970,731 | A | 10/1999 | Hare et al. | | |
| 6,035,655 | A | 3/2000 | Hare et al. | | |

(Continued)

*Primary Examiner* — Ryan B Huang
*Assistant Examiner* — Adam Adrien Germain
(74) *Attorney, Agent, or Firm* — Quarles & Brady LLP

(57) ABSTRACT

A method for servicing a section of a first flow line of a redundant flow line system with a second flow line in a closed-loop liquid cooling system. The method can include draining liquid from the first flow line through a liquid transfer assembly and servicing the section of the first flow line. The method can also include transferring liquid from the second flow line to the first flow line through the liquid transfer assembly and decoupling the liquid transfer assembly from the first flow line and the second flow line. The method can also include coupling the liquid transfer assembly to and between the first flow line and the second flow line.

20 Claims, 6 Drawing Sheets

(56) References Cited

U.S. PATENT DOCUMENTS

| | | | | |
|---|---|---|---|---|
| 6,182,742 | B1 | 2/2001 | Takahashi et al. | |
| 6,213,194 | B1 | 4/2001 | Chrysler et al. | |
| 6,558,554 | B1 * | 5/2003 | Jones | B01D 37/04 210/744 |
| 6,807,056 | B2 | 10/2004 | Kondo et al. | |
| 6,877,531 | B2 * | 4/2005 | Few | F01M 11/04 141/2 |
| 7,050,299 | B2 | 5/2006 | Kondo et al. | |
| 7,325,588 | B2 | 2/2008 | Malone et al. | |
| 7,420,804 | B2 | 9/2008 | Leija et al. | |
| 7,436,666 | B1 | 10/2008 | Konshak | |
| 8,387,249 | B2 | 3/2013 | Campbell et al. | |
| 8,514,575 | B2 | 8/2013 | Goth et al. | |
| 8,857,057 | B2 | 10/2014 | Campbell et al. | |
| 9,357,674 | B2 | 5/2016 | Campbell et al. | |
| 9,763,357 | B2 | 9/2017 | Campbell et al. | |
| 9,832,913 | B2 | 11/2017 | Shedd | |
| 9,848,509 | B2 | 12/2017 | Shedd et al. | |
| 9,852,963 | B2 | 12/2017 | Shedd et al. | |
| 9,854,714 | B2 | 12/2017 | Shedd | |
| 9,854,715 | B2 | 12/2017 | Shedd et al. | |
| 9,861,013 | B2 | 1/2018 | Edwards et al. | |
| 9,891,002 | B2 | 2/2018 | Shedd et al. | |
| 9,901,008 | B2 | 2/2018 | Shedd et al. | |
| 9,901,013 | B2 | 2/2018 | Shedd et al. | |
| 9,918,409 | B2 | 3/2018 | Edwards et al. | |
| 10,088,238 | B2 | 10/2018 | Shedd | |
| 10,184,699 | B2 * | 1/2019 | Shedd | F28F 13/02 |
| 10,648,369 | B2 * | 5/2020 | Dokic | F01K 23/10 |
| 11,145,570 | B2 | 10/2021 | Qu et al. | |
| 2009/0056553 | A1 * | 3/2009 | Konishi | F15B 1/26 96/204 |
| 2009/0120622 | A1 | 5/2009 | Koch | |
| 2009/0126910 | A1 * | 5/2009 | Campbell | H05K 7/20781 165/104.33 |
| 2016/0242326 | A1 * | 8/2016 | Edwards | F04D 25/16 |
| 2019/0107255 | A1 * | 4/2019 | Rapport | C02F 1/00 |
| 2021/0022263 | A1 * | 1/2021 | Enright | B25J 11/00 |
| 2021/0060621 | A1 * | 3/2021 | Seippel | B08B 9/0328 |

* cited by examiner

METHOD FOR LIQUID FILTER ASSEMBLY

CROSS-REFERENCE TO RELATED APPLICATIONS

This application claims priority to U.S. Provisional Patent Application No. 63/236,115, filed Aug. 23, 2021, titled "Method for Liquid Filter Assembly," the entirety of which is incorporated herein by reference.

BACKGROUND

In some closed-loop liquid cooling system applications liquid is pumped through the system to remove heat from systems that include heat producing components. A liquid filter housed within a liquid filter assembly can be used in these cooling system applications to filter out any unwanted impurities from the liquid. Occasionally, the liquid filter assembly should be accessed to inspect or replace the liquid filter.

SUMMARY

Some embodiments of the invention can provide method for servicing a first flow line of a redundant flow line system with a second flow line in a closed-loop liquid cooling system. The method can include draining liquid from the first flow line through a liquid transfer assembly configured to be in selective fluid communication with each of the first and second flow lines, servicing a section of the first flow line, and transferring liquid from the second flow line to the first flow line through the liquid transfer assembly.

Some embodiments of the invention can provide a method for servicing a filter in a first flow line of a redundant flow line liquid cooling system with the first flow line and a second flow line operating in parallel. The method can include draining liquid from the first flow line, servicing the filter, and transferring liquid from the second flow line to the first flow line to refill the first flow line.

Some embodiments of the invention can provide a method for servicing a filter in a first flow line of a closed-loop redundant flow line liquid cooling system with the first flow line and a second flow line operating in parallel. The method can include stopping the flow of liquid through the first flow line; removing liquid from the first flow line, including the filter housing; accessing the filter within the filter housing; refilling the first flow line and the filter housing with liquid; and bleeding the first flow line.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
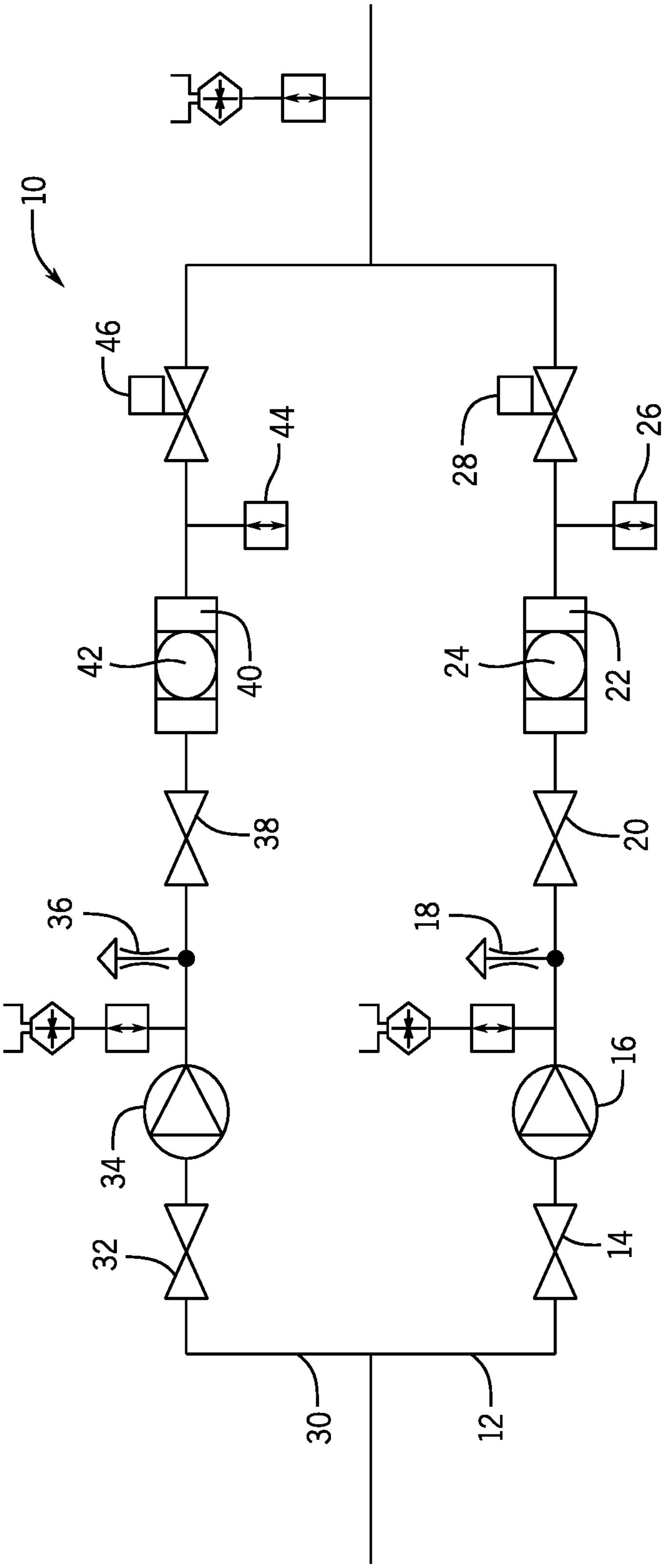
FIG. 1 is a schematic of part of a closed-loop liquid cooling system according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some of the discussion below describes a liquid transfer assembly that can be used in cooperation with a closed-loop liquid cooling system, or other multi-branch, pumped fluid systems, when servicing a fluid filter in the system. The liquid transfer assembly can be wholly incorporated as part of the closed-loop liquid cooling system or can be removably attachable to the system. The liquid transfer assembly can reduce liquid cooling fluid waste and the time required to service a fluid filter. The context and particulars of this discussion are presented as examples only. For example, embodiments of the disclosed invention can be used in other contexts, such as for redundant liquid systems in other than cooling applications.

When changing a filter in a liquid flow line of a closed-loop liquid cooling system, it is generally good practice to minimize the volume of liquid removed during draining of a filter chamber and associated filter column. Removing too much chemically treated liquid, for example, can significantly change the chemical composition of the liquid when refilling with liquid from a reservoir. Further, the air bleed or air venting process that occurs when refilling a filter chamber and filter column after a filter service procedure can require removing additional liquid from the closed system in order to remove all of the air from the system. This can require more make-up liquid to be added to the system to "bleed" the system. This additional liquid can potentially have a different chemical composition than the liquid in the closed loop.

Conventional arrangements for changing a filter in a liquid flow line of a redundant closed-loop liquid cooling system can require draining a substantial amount of fluid in the liquid flow line being serviced to access, remove, and replace the filter. The liquid in a closed-loop liquid system typically has a defined chemical composition that should be maintained. Thus, removing a substantial amount of fluid from the system will require rebalancing the chemical composition when new fluid is added into the system. Further, when liquid is removed from the system, air enters, and this air needs to be removed prior to reengaging the liquid flow line after servicing. The introduction of air into the system negatively affects the thermal performance of the overall system until the air is removed. Air can be removed through manual methods such as, for example, spot bleeding downstream components (e.g., rack manifolds, cold plate cooling loops, and facility manifold air traps). In some systems, operating conditions can involve high velocity liquid flow applications in which the air in the system does not have the ability to accumulate. This can create small pockets of air or air bubble accumulation in the parts of the system with the slowest flow velocity, which may be within thermally conductive parts of the system. From a performance perspective of electronic components (e.g., central processing units, general-purpose graphics processing units, application-specific integrated circuits, and other IT cooled components), trapped and circulating air within the liquid cooling system can negatively affect the heat transfer of these components, which can degrade their performance. Therefore, in addition to the wastefulness of draining a substantial amount of fluid during the service, an extensive amount of time may be required to add new fluid, remove air, and rebalance the chemical composition of the system prior to the system being fully operational again.

Embodiments of the invention can address these or other issues, including by minimizing the volume of liquid removed during servicing of a fluid filter and reducing the amount of air introduced into the system. For example, in some embodiments, a liquid transfer assembly can be coupled to each of the filter columns below the respective filter chamber and ahead of a respective valve configured to regulate liquid flow from each of the flow lines of the redundant flow line assembly.

In some embodiments, a method for draining and filling a flow line in a redundant flow line assembly of a closed-loop liquid cooling system can include coupling a liquid transfer assembly to the redundant flow line assembly. The liquid transfer assembly can be fixedly coupled or removably coupled to a drain valve on each flow line. The liquid transfer assembly can include a plurality of valves (or other valve arrangement) allowing liquid to flow from each flow line to outside of the system and to flow between the flow lines. Draining fluid from only one of the flow lines can allow an operator to service a filter in the flow line without interrupting the other flow line. Refilling the serviced flow line by transferring liquid from the non-serviced flow line reduces liquid coolant waste and optimizes the refill rate by refilling with existing liquid from within the system and under system pressure.

In some embodiments, air-bleed valves are positioned at the highest point in the flow lines. The air-bleed valves can let air into the flow line during draining operations to more quickly drain the flow line, and can allow air to escape when refilling the flow line.

Figure 2:
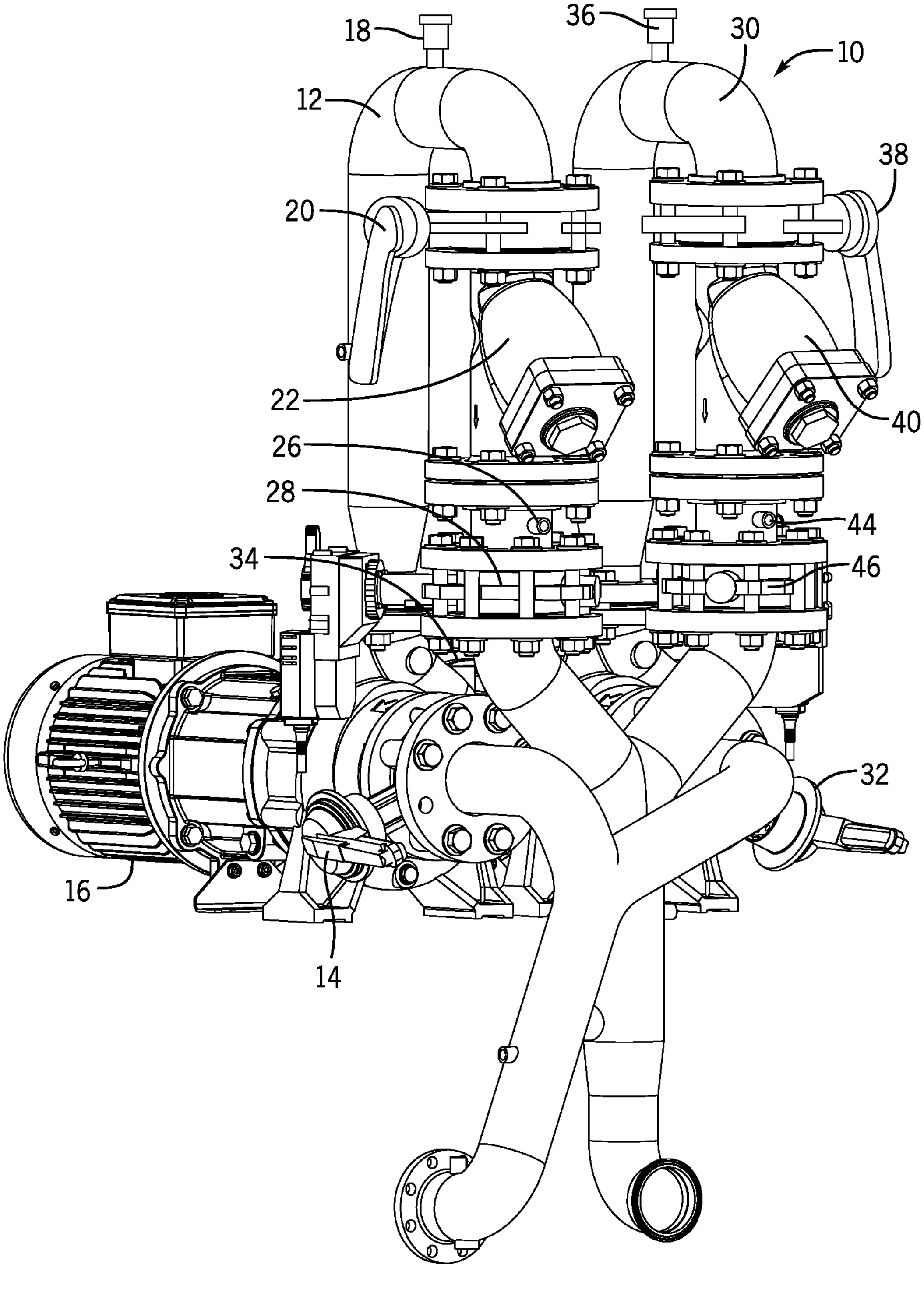
FIG. 2 is a rear isometric view of the closed-loop liquid cooling system of FIG. 1.

In the context of servicing a filter in a closed-loop liquid cooling system (not shown in full), which is configured to remove heat from electrical equipment (not shown), FIGS. 1 and 2 illustrate example redundant first and second flow lines 12, 30 that are part of a redundant flow line and filter assembly 10 in the closed-loop liquid cooling system. Servicing a filter can include removing an existing filter from a filter housing and installing a new filter.

The first flow line 12 of the redundant flow line and filter assembly 10 can include a first entry valve 14, a first pump 16, a first air-bleed valve 18, a first pre-filter valve 20, a first filter housing 22 with a first filter 24, a first liquid port 26, and a first egress valve 28. The first air-bleed valve 18 is shown as an automatic air vent, although other configurations are possible, and is located at the highest point of the first flow line 12 between the first pump 16 and the first pre-filter valve 20. Further, the first liquid port 26 is located between the first filter housing 22 and the first egress valve 28. Looking at the assembly 10 shown in FIG. 2, the arrangement of components corresponds to the advantageous use of gravity and fluid densities during draining and refilling of the assembly 10. For example, the first liquid port 26 is below the first air-bleed valve 18 and above the first filter housing 22. As discussed further below with respect to a method of draining and filling a flow line before and after servicing a filter, the relative vertical positions of the first air-bleed valve 18, the first filter housing 22, and the first liquid port 26 aids in the removal of liquid from the first filter housing 22 and the surrounding portion of the first flow line 12. During liquid removal, gravity urges the liquid and pressure is released from within the first flow line 12 as air is able to enter through the first air-bleed valve 18, forcing the liquid out through the first liquid port 26. During refilling of liquid back into the first filter housing 22 and the surrounding portion of the first flow line 12, liquid is introduced into the first flow line 12 at the lowest point at which liquid was removed, which is at the first liquid port 26. The liquid entering the first liquid port 26 enters the first flow line 12 and pushes air present within the first flow line 12 upward and out through the first air-bleed valve 18 as the first filter housing 22 and the first flow line 12 are refilled.

Additionally, as shown in FIG. 2, the first entry valve 14 and the first pre-filter valve 20 are manual valves and the first egress valve 28 is an electro-mechanical valve. However, it is contemplated that any combination of manual and electro-mechanical valves can be used, including all manual or all electro-mechanical, for the first entry valve 14, the first pre-filter valve 20, and the first egress valve 28.

The second flow line 30 is substantially identical to the first flow line 12 because it is the second half of the redundant flow line and filter assembly 10, although other configurations are possible. The second flow line 30 includes a second entry valve 32, a second pump 34, a second air-bleed valve 36, a second pre-filter valve 38, a second filter housing 40 with a second filter 42, a second liquid port 44, and a second egress valve 46. Arrangement of the elements of the second flow line 30 are the same as that of the first flow line 12. Similarly, although FIG. 2 shows the second flow line 30 with manual valves for the second entry valve 32 and the second pre-filter valve 38 and an electro-mechanical valve for the second egress valve 46, other combinations of manual and electro-mechanical valves are contemplated.

In operation, generally, liquid will flow through both the first flow line 12 and the second flow line 30 simultaneously and through the rest of the closed loop cooling system to remove heat from the electrical equipment (not shown). The redundant first and second flow lines 12, 30 are configured to allow personnel to close-off liquid passage through either of the first or second flow lines 12, 30 to service the respective filter 24, 42, while allowing the cooling liquid to continue flowing, uninterrupted, through the other, open, first or second flow line 12, 32 and the rest of the closed-loop liquid cooling system.

Figure 3:
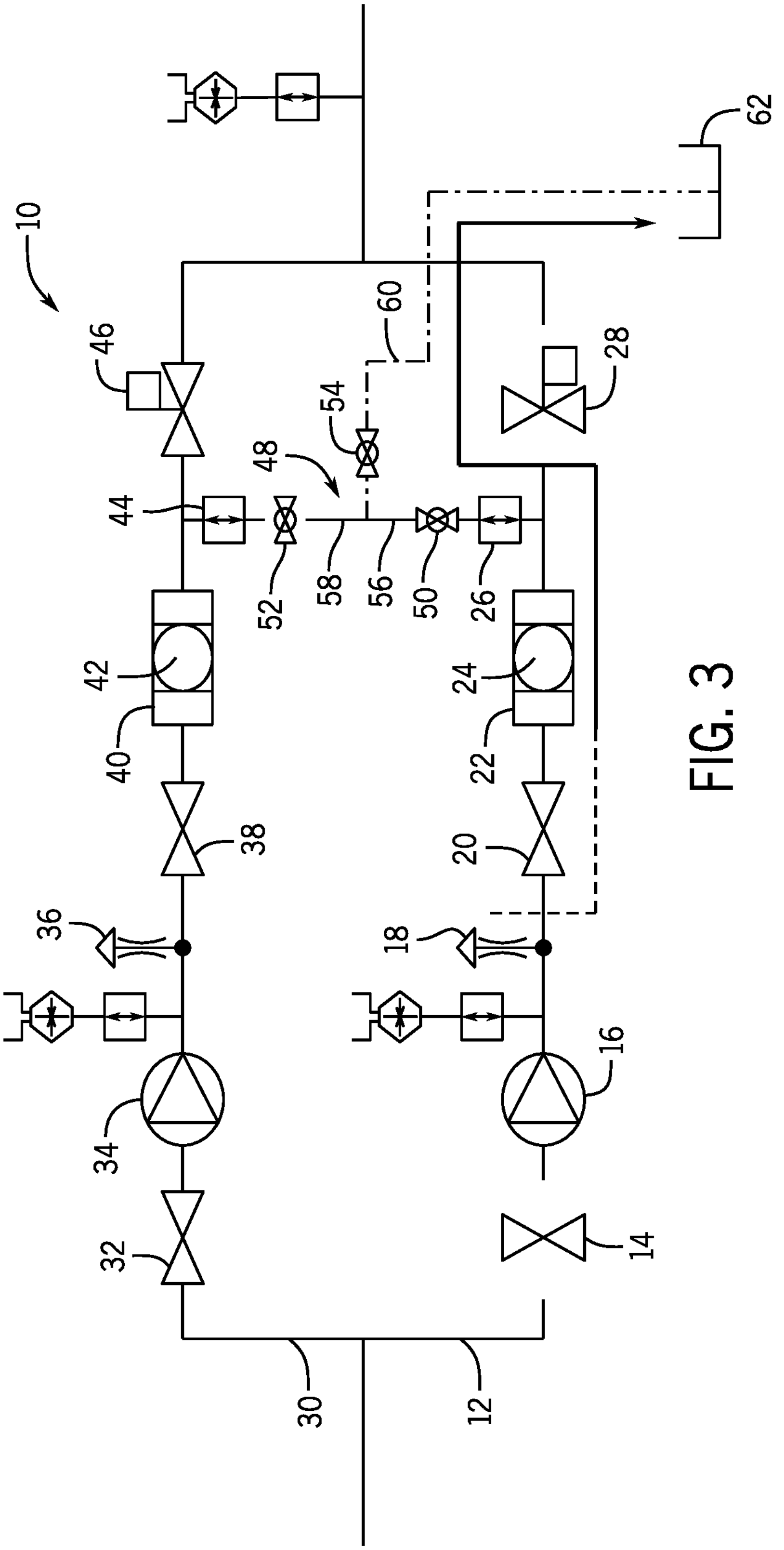
FIG. 3 is a schematic of the closed-loop liquid cooling system of FIG. 1 with a liquid transfer assembly in a drain configuration according to an embodiment of the invention.
Figure 4:
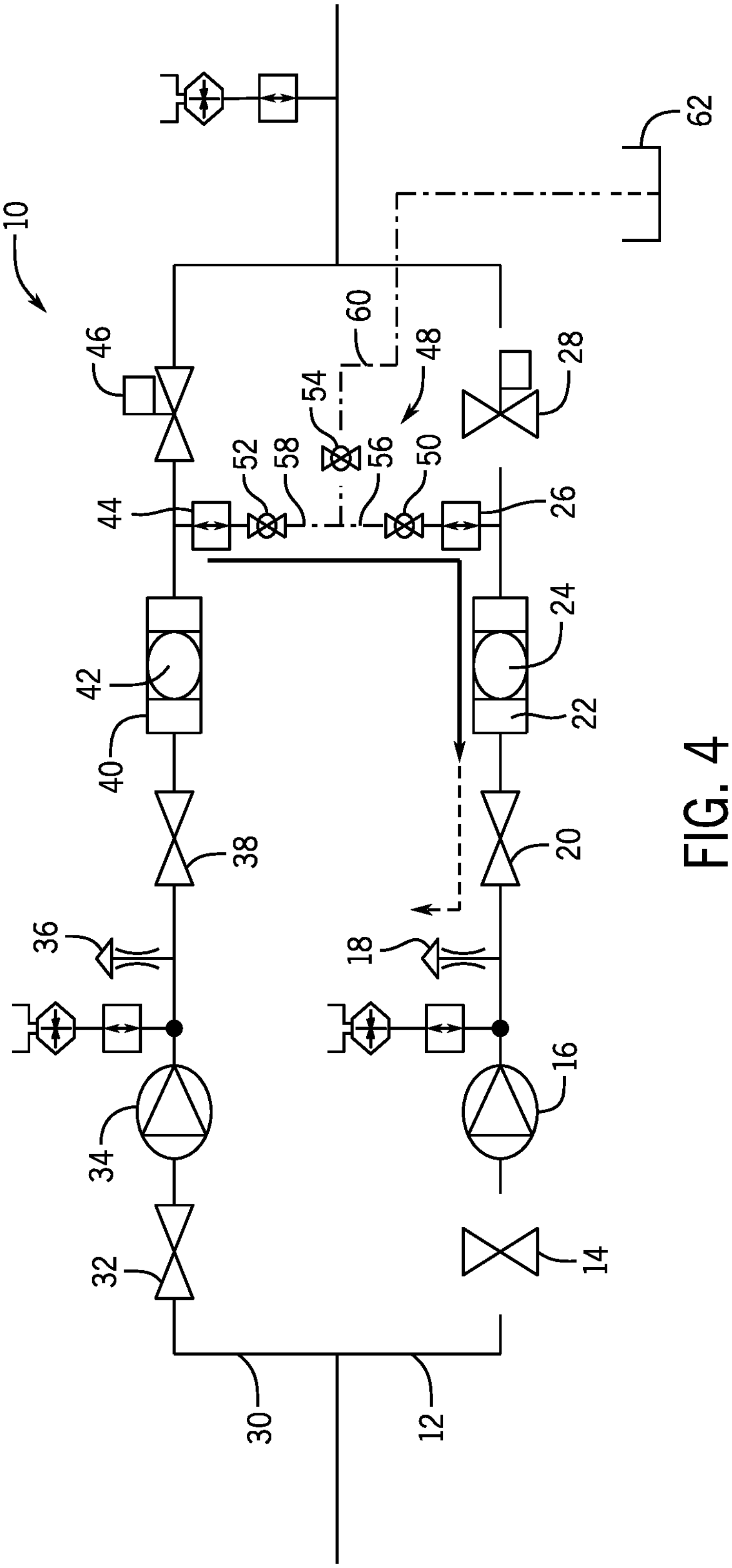
FIG. 4 is a schematic of the closed-loop liquid cooling system of FIG. 1 with a liquid transfer assembly in a fill configuration according to an embodiment of the invention.

In some embodiments, a permanent or removable liquid transfer assembly can provide selective liquid communication between two flow lines of a system, as can assist operators in efficiently draining and filling either of the flow lines. For example, FIGS. 3 and 4 illustrate the first and second flow lines 12, 30 with a liquid transfer assembly 48. The liquid transfer assembly 48 has a first transfer valve 50, a second transfer valve 52, and a drain valve 54. The first transfer valve 50, the second transfer valve 52, and the drain valve 54 can be in fluid communication through a set of liquid passageways 56, 58, 60. The liquid transfer assembly 48 is shown as a T-shaped manifold with the first transfer valve 50 and the second transfer valve 52 positioned on the arms of the T-shaped manifold and the drain valve 54 positioned in the stem. The first transfer valve 50, the second transfer valve 52, and the drain valve 54 can be manual two-way ball valves and the liquid passageways 56, 58, 60 can be flexible hose. However, it is contemplated that the liquid transfer assembly 48 can take other forms and incorporate other types of valves (e.g., a Y-shaped or an inline manifold incorporating two two-way valves and one three-way valve). Further, the liquid passageways 56, 58, 60 can be ridged plastic or metal pipe.

Continuing to view the embodiment shown in FIGS. 3 and 4, the liquid transfer assembly 48 is configured to be removably coupled to the first liquid port 26 of the first flow line 12 and the second liquid port 44 of the second flow line 30. The removable coupling can be accomplished through disconnect fittings (e.g., a ball-lock coupling, a roller-lock coupling, or a pin-lock coupling). However, it is contemplated that the liquid transfer assembly 48 can be fully incorporated into the redundant flow line and filter assembly 10 with a permanent connection.

Figure 5:
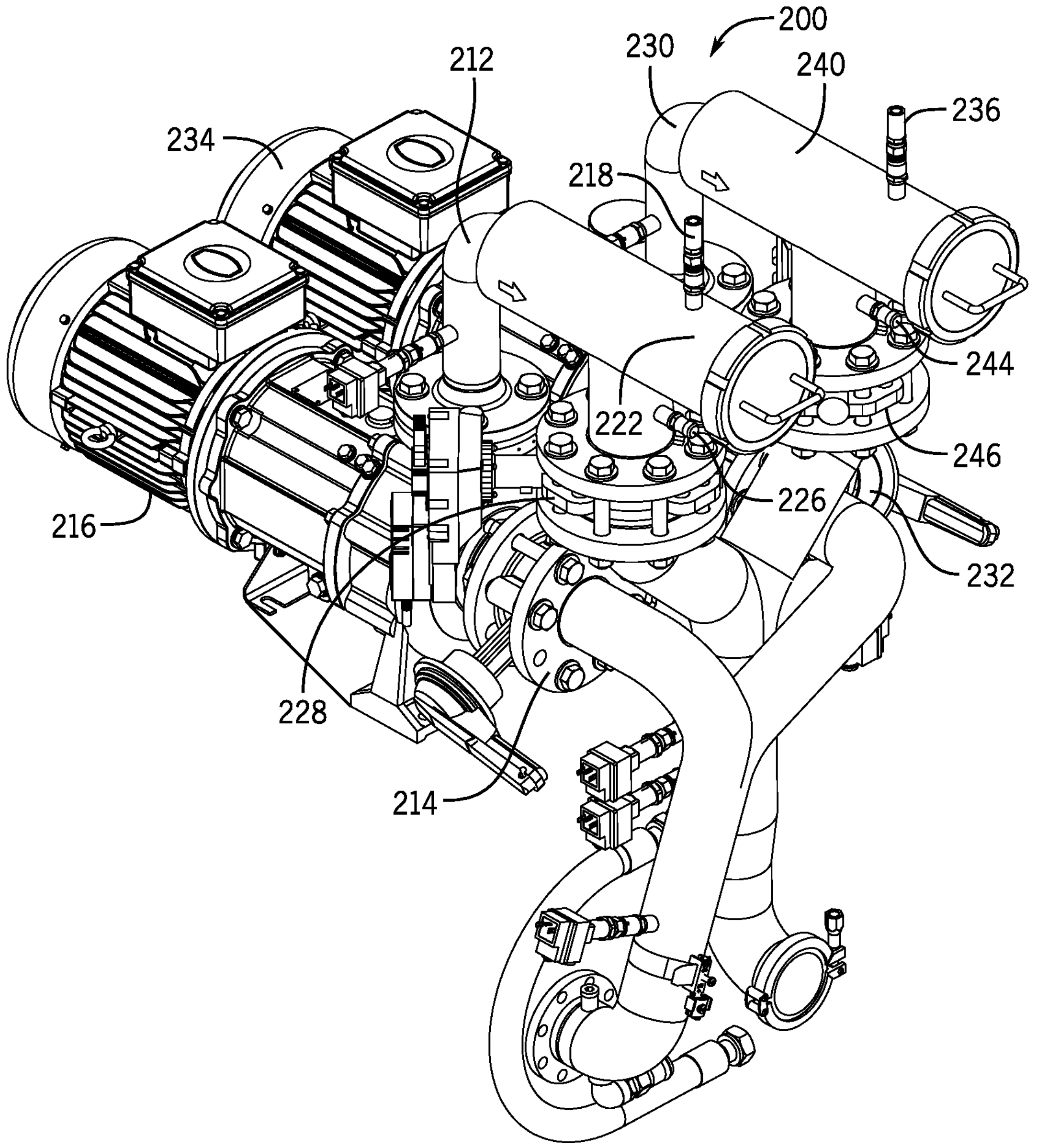
FIG. 5 is a rear isometric view of a closed-loop liquid cooling system according to another embodiment of the invention.

FIG. 5 illustrates another example of a redundant flow line and filter assembly 200, as can also be used in a closed-loop liquid cooling system. In many aspects, the assembly 200 is similar to the assembly 10 described above and similar numbering in the 200 series is used for the assembly 200. For example, the assembly 200 has with redundant first and second flow lines 212, 230. The first flow line 212 includes a first entry valve 214, a first pump 216, a first air-bleed valve 218, a first filter housing 222 (containing a removable a filter (hidden)), a first liquid port 226, and a first egress valve 228. Similarly, the second flow line 230 includes a second entry valve 232, a second pump 234, a second air-bleed valve 236, a second filter housing 240 (containing a removable a filter (hidden)), a second liquid port 244, and a second egress valve 246.

Additionally, the assembly 200 generally operates similar to the assembly 10. Liquid will flow through both the first flow line 212 and the second flow line 230 simultaneously and through the rest of the closed loop cooling system to remove heat from the electrical equipment (not shown). The redundant first and second flow lines 212, 230 are configured to allow personnel to close-off liquid passage through either of the first or second flow lines 212, 230 to access a filter within the respective filter housing 222, 240, while allowing the cooling liquid to continue flowing, uninterrupted, through the other, open, first or second flow line 212, 232 and the rest of the closed-loop liquid cooling system.

Further, the arrangement of elements to take advantage of gravity and fluid densities during draining and refilling of the assembly 200 is similar to the assembly 10. For example, the vertical arrangement of the first air-bleed valve 218, the first filter housing 222, and the first liquid port 226 (listed in order from top to bottom) aids in the removal of liquid from the first filter housing 222 and the surrounding portion of the first flow line 212. Gravity urges the liquid and pressure is released within the first flow line 212 as air is able to enter through the first air-bleed valve 218, forcing the liquid out through the first liquid port 226. Refilling liquid into the first filter housing 222 and the surrounding portion of the first flow line 212 is performed by introducing liquid back into the first flow line 212 at the lowest point at which liquid was removed, which is at the first liquid port 226. The liquid entering the first liquid port 226 enters the first flow line 212 and pushes air present within the first flow line 212 upward and out through the first air-bleed valve 218 as the first filter housing 222 and the first flow line 212 are refilled.

In some aspects, however, the assemblies 10, 200 differ from each other. For example, the first and second filter housings 222, 240 are horizontally oriented canister filter housings instead of Y-strainer housings. During filter servicing, the horizontal orientation has a tendency to trap less secondary liquid as the respective flow line is drained, making servicing less messy and potentially less wasteful. Additionally, although the first and second air-bleed valves 218, 236 are still mounted at the highest point within the first and second flow lines 212, 230 as they are in the assembly 10, the first and second air-bleed valves 218, 236 are mounted on top of the respective first and second filter housing 222, 224, which are positioned at the top of the assembly 200.

In some embodiments, the principles disclosed herein can be implemented as a method, including a computer-implemented method that can be at least partially executed by a processor device, based on appropriate input from an operator or from a variety of sensors or other modules. For example, a method 100 for draining and refilling a flow line is shown in FIG. 5. The method can be performed in a closed-loop liquid cooling system to access and service a liquid filter. For simplicity and clarity, the method is discussed with respect to the draining and filling of the first flow line 12. However, it should be understood that the method can be equally performed with respect to the second flow line 30. Further, FIGS. 3 and 4 provide additional support for the method and will be referenced throughout. As stated previously, prior to performing the method, liquid is typically flowing through both the first and second flow lines 12, 30 and through the rest of the closed-loop liquid cooling system.

Figure 6:
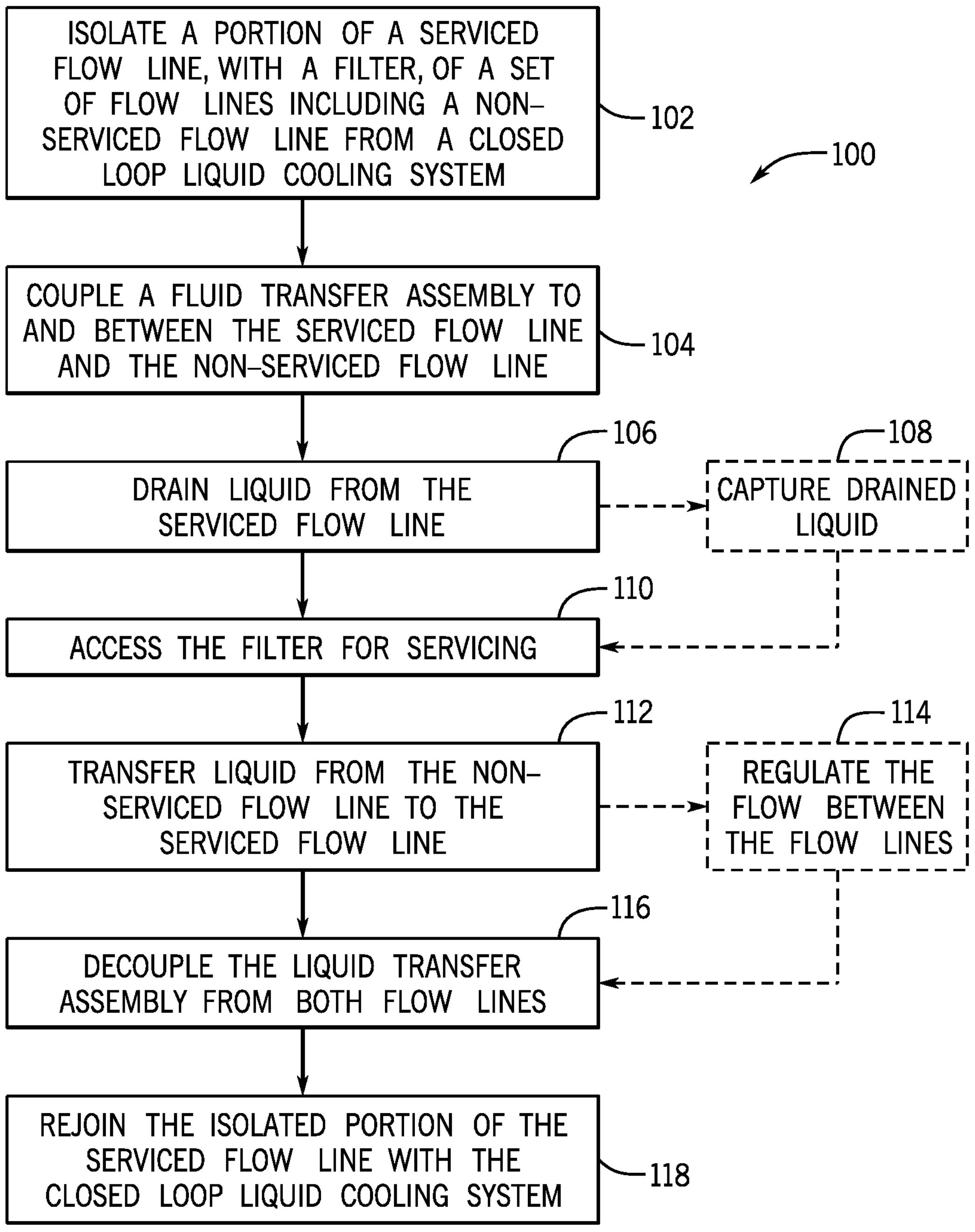
FIG. 6 is a flow diagram of a method of draining and filling a closed-loop liquid cooling system according to an embodiment of the invention.

Looking now to FIG. 6, the method 100 for draining and refilling a flow line of a redundant flow line closed-loop liquid cooling system to service a filter housing (e.g., the first filter housing 22 of the first flow line 12 of the redundant flow line and filter assembly 10) can include, isolating 102 the portion of the flow line with the filter housing from the rest of the closed-loop liquid cooling system (e.g., closing the first entry valve 14 and the first egress valve 28 of the first flow line 12 of the redundant flow line and filter assembly 10 to cut off the flow of liquid through the flow line (as shown in FIG. 3)). Then, a liquid transfer assembly (e.g., the liquid transfer assembly 48) can be coupled 104, in a closed configuration (e.g., with the first transfer valve 50, the second transfer valve 52, and the drain valve 54 all in closed positions), to both flow lines of the closed-loop liquid cooling system (e.g., to the first liquid port 26 and the second liquid port 44). The liquid can then be drained 106 from the flow line (e.g., by opening the first transfer valve 50 and the drain valve 54 to drain liquid from the first flow line 12 from around the first filter housing 22 through the first and third passageways 56, 60 (as illustrated with a liquid draining flow path arrow in FIG. 3)). Optionally, the drained liquid can be captured 108 in a reservoir (e.g., see reservoir 62 in FIG. 3) to later be added back into the closed-loop liquid cooling system. In this regard, the liquid transfer assembly 48 can also be selectively used to easily obtain fluid samples from a particular flow loop, including at times other than during servicing of a filter.

Initially, the flow line may be at positive pressure, which can facilitate relatively high flow rates for liquid draining. However, after the pressure equalizes to around atmospheric pressure, the draining may tend to slow or stop due pressure equalization or vacuum creation within the flow line. In this regard, for example, an air-bleed valve (e.g., the first air-bleed valve 18) can operate as a liquid float valve, whereby, when the initial positive pressure within the flow line is sufficiently reduced, the force of the draining liquid will cause the air-bleed valve 18 to break seal and allow air to pass into the flow line to further facilitate draining of the liquid from the flow line. Accessing 110 the filter housing to service a filter therein.

After draining the flow line, and servicing of the filter in the flow line is complete, the serviced flow line can be refilled, in some cases in an upstream-to-downstream direction, relative to normal flow in the refilled flow line, with liquid from the other (e.g., non-serviced) flow line. For example, the method 100 can include transferring 112 liquid from the non-serviced flow line to the serviced flow line (e.g., looking at FIG. 4, the drain valve 54 of the liquid transfer assembly 48 is closed and the second transfer valve 52 is open). Liquid can then flow from the non-serviced flow line and into the serviced flow line through the liquid transfer assembly (e.g., through the first and second passageways 56, 58 (as illustrated with a liquid filling flow path arrow in FIG. 4)). Optionally, the flow between the flow lines (e.g., either of the first or second transfer valves 50, 52 of the liquid transfer assembly 48 can be regulated 114 to control the filling rate of the flow line). In the example configuration, because the flow line is reverse filled, the air-bleed valve allows air within the flow line to escape, thereby bleeding the flow line without requiring excessive liquid removal as part of the liquid filling and air venting process.

In some cases, a controlled filling process, including as described above, can allow the liquid make-up system (not shown) of the closed-loop liquid cooling system to function as it would through a normal liquid make-up process. For example, as liquid volume is removed from the active liquid loop as part of the filling process, the decreasing volume can cause a reduction in detected system pressure. The make-up system may then add liquid to the system as needed, to help prevent the system from experiencing wide variations in system pressure, which could affect downstream flow and potentially impact overall heat rejection capability.

Additionally, when the serviced flow line is being refilled by liquid under pressure produced by the pump of the non-serviced flow line, the refilled liquid in the serviced flow line may be at the preferred system pressure and there may therefore be no need for an external pump to pressurize this liquid prior to rejoining the flow line with the rest of the closed-loop liquid cooling system. This can also minimize or prevent "water hammer" when placing the flow line back into operation after service. After the flow line is adequately filled, the method can conclude with decoupling 116 the liquid transfer assembly from both flow lines of the closed-loop liquid cooling system (e.g., first closing at least the first transfer valve 50 and the second transfer valve 52 and decoupling from the first liquid port 26 and the second liquid port 44), and rejoining 118 the portion of the flow line with the filter housing with the rest of the closed-loop liquid cooling system (e.g., by opening the first entry valve 14 and the first egress valve 28 to allow liquid to flow through the first flow line 12 again).

In some embodiments, as also noted above, a liquid transfer assembly can be permanently included in a larger flow system, rather than being a removable assembly. In such embodiments, for example, the liquid transfer assembly may be selectively fluidly decoupled from a set of flow lines (e.g., via manual operation of one or more valves) but may not necessarily be mechanically decoupled (e.g., detached) from the system.

In some embodiments, however, a removable liquid transfer assembly may provide certain benefits. For example, the liquid transfer assembly 48 can be configured to be readily moved between multiple different cooling flow loops, so as to allow for easy draining and refilling of each of the flow loops in succession, without the need for complex interconnection of flow lines or parts, and without the expense of dedicated (e.g., integrated) liquid transfer assemblies for each relevant cooling system.

Thus, embodiments of the invention can provide improved methods for draining and filling a flow line in a redundant flow line assembly of a closed-loop liquid cooling system. In some embodiments, for example, a liquid transfer assembly can be coupled to both flow lines and can be configured to drain one of the flow lines and transfer liquid between the flow lines. The liquid transfer assembly can be removably coupled to the flow lines with quick connection fittings.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A method for servicing a flow line of a redundant flow line system in a closed-loop liquid cooling system, the method comprising:

providing the redundant flow line system with a first flow line and a second flow line, the second flow line being a redundant flow line of the first flow line;

providing a liquid transfer assembly, the liquid transfer assembly being selectively secured to each of the first and second flow lines to permit selective fluid transfer between the first and second flow lines;

isolating a section of the first flow line of the closed-loop liquid cooling system by closing a first entry valve and a first egress valve on upstream and downstream sides of the section, respectively, the section including a first liquid port, the first liquid port being positioned between the first entry valve and the first egress valve;
removably coupling the liquid transfer assembly to the first liquid port;
draining liquid from the first flow line via the liquid transfer assembly;
servicing the section of the first flow line; and
transferring liquid from the second flow line to the first flow line via the liquid transfer assembly to refill the first flow line.

2. The method of claim 1, wherein the liquid transfer assembly is removably coupled to and between the first flow line and the second flow line.

3. The method of claim 1, further comprising:
rejoining the section with the closed-loop liquid cooling system by opening the entry valve and the egress valve.

4. The method of claim 1, further comprising capturing the liquid drained from the first flow line in a reservoir.

5. The method of claim 1, wherein servicing the section includes replacing a liquid filter in a filter housing.

6. The method of claim 1, further comprising regulating the flow of the transfer of liquid through the liquid transfer assembly and between the first and second flow lines.

7. A method for servicing a flow line of a redundant flow line liquid cooling system, the method comprising:
providing the redundant flow line liquid cooling system with a first flow line including a filter and a second flow line, the second flow line being a redundant flow line of the first flow line operating in parallel with the first flow line;
providing a liquid transfer assembly selectively arranged between the first flow line and second flow line to permit selective fluid communication with each of the first and second flow lines;
isolating a section of the first flow line of the redundant flow line liquid cooling system by closing a first entry valve and a first egress valve on upstream and downstream sides of the section, respectively, the section including a first liquid port and the filter, the first liquid port being positioned between the first entry valve and the first egress valve;
removably coupling the liquid transfer assembly to the first liquid port;
draining liquid from the first flow line via the liquid transfer assembly;
servicing the filter; and
transferring liquid from the second flow line to the first flow line to refill the first flow line, the liquid being transferred to the first flow line via the liquid transfer.

8. The method of claim 7, wherein the liquid transfer assembly includes a first transfer valve, a second transfer valve, and a drain valve, wherein the liquid transfer assembly is removably coupled to the first liquid port on the first flow line and a second liquid port on the second flow line; and
wherein draining the liquid from the first flow line comprises opening the first transfer valve and the drain valve.

9. The method of claim 8, wherein transferring the liquid from the second flow line to the first flow line comprises closing the drain valve and opening the second transfer valve.

10. A method for servicing a filter within a filter housing in a flow line of a closed-loop redundant flow line liquid cooling system, the method comprising:
providing the closed-loop redundant flow line liquid cooling system with a first flow line and a second flow line, the second flow line being a redundant flow line of the first flow line, and the second flow line operating in parallel with the first flow line;
providing a liquid transfer assembly arranged between the first and second flow lines, the liquid transfer assembly being selectively secured to each of the first and second flow lines to permit selective fluid transfer between the first and second flow lines;
stopping the flow of liquid through the first flow line by closing a first entry valve and a first egress valve of upstream and downstream sides of the first flow line, respectively, the first flow line including a filter within a filter housing and a first liquid port, the first liquid port being positioned between the first entry valve and the first egress valve;
removably coupling the liquid transfer assembly to the first liquid port;
removing the liquid from the first flow line;
accessing the filter within the filter housing;
refilling the first flow line and the filter housing with liquid from the second flow line, the liquid from the second flow line being transferred to the first flow line via the liquid transfer assembly; and
bleeding the first flow line.

11. The method of claim 10, wherein the first egress valve is located vertically below the filter housing.

12. The method of claim 10, wherein the first flow line includes a first air-bleed valve positioned vertically above the filter housing and the first liquid port is positioned vertically below the filter housing.

13. The method of claim 12, wherein the removing of the liquid from the first flow line is accomplished by opening a first transfer valve at the first liquid port and allowing air to enter into the first flow line through the first air-bleed valve, whereby gravity aids in draining the liquid from the first flow line and the filter housing.

14. The method of claim 12, wherein the liquid from the second flow line exits a second liquid port in the second flow line.

15. The method of claim 14, wherein the liquid transfer assembly is coupled to and between the first and second liquid ports to provide fluid communication therebetween.

16. The method of claim 15, wherein the liquid transfer assembly is removably coupled to the first and second liquid ports.

17. The method of claim 12, wherein the bleeding of the first flow line is accomplished by filling the first flow line with liquid and forcing air within the first flow line upward and out through the first air-bleed valve.

18. The method of claim 1, wherein removably coupling the liquid transfer assembly to the first liquid port on the first flow line further comprises:
removably coupling the liquid transfer assembly to a second liquid port on the second flow line, so that the liquid transfer assembly is coupled to both the first liquid port on the first flow line and the second liquid port on the second flow line.

19. The method of claim 18, wherein the liquid transfer assembly includes a first transfer valve, a second transfer valve, and a drain valve, and wherein draining the liquid from the first flow line via the liquid transfer assembly includes:
opening the first transfer valve and the drain valve of the liquid transfer assembly, so that the first flow line is drained through the liquid transfer assembly via the first transfer valve and the drain valve of the liquid transfer assembly.

20. The method of claim 19, wherein transferring the liquid from the second flow line to the first flow line via the liquid transfer assembly to refill the first flow line includes:

closing the drain valve of the liquid transfer assembly; and opening the second transfer valve of the liquid transfer assembly so that liquid is transferred from the second liquid port of the second flow line to the first liquid port of the first flow line via the liquid transfer assembly.

* * * * *